Oct. 23, 1951 H. L. BARNEY 2,572,586

SWEEP CIRCUIT

Filed March 18, 1950 5 Sheets-Sheet 1

INVENTOR
H. L. BARNEY
BY Hugh S. Wertz
ATTORNEY

Oct. 23, 1951 H. L. BARNEY 2,572,586

SWEEP CIRCUIT

Filed March 18, 1950 5 Sheets-Sheet 2

INVENTOR
H. L. BARNEY
BY Hugh S. Wertz
ATTORNEY

Oct. 23, 1951 H. L. BARNEY 2,572,586

SWEEP CIRCUIT

Filed March 18, 1950 5 Sheets-Sheet 3

FIG. 5A

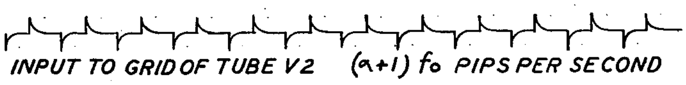

INPUT TO GRID OF TUBE V2 $(\alpha+1) f_0$ PIPS PER SECOND

FIG. 5B

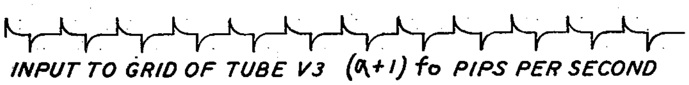

INPUT TO GRID OF TUBE V3 $(\alpha+1) f_0$ PIPS PER SECOND

FIG. 5C

INPUT TO CATHODES OF TUBES V2 & V3 $f_0$ SQUARE WAVE

FIG. 5D

OUTPUT OF TUBES V2 & V3 TO GRID OF BLOCKING OSC. TUBE V4

FIG. 5E

INPUT TO GRID OF TUBE V1 $\alpha f_0$ SQUARE WAVE

FIG. 5F

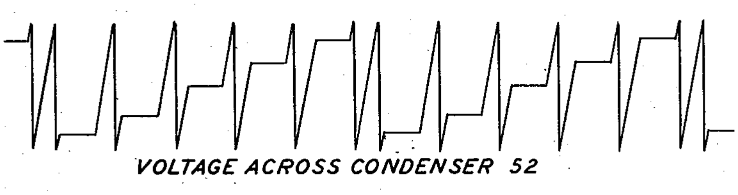

VOLTAGE ACROSS CONDENSER 52

FIG. 7A

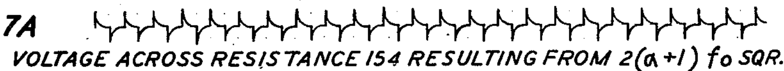

VOLTAGE ACROSS RESISTANCE 154 RESULTING FROM $2(\alpha+1) f_0$ SQR. WAVE INPUT

FIG. 7B

INPUT TO TRANSFORMERS T11 & T14 $\alpha f_0$ SQUARE WAVE

FIG. 7C

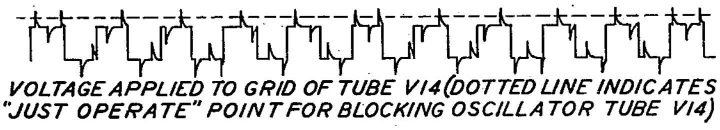

VOLTAGE APPLIED TO GRID OF TUBE V14 (DOTTED LINE INDICATES "JUST OPERATE" POINT FOR BLOCKING OSCILLATOR TUBE V14)

FIG. 7D

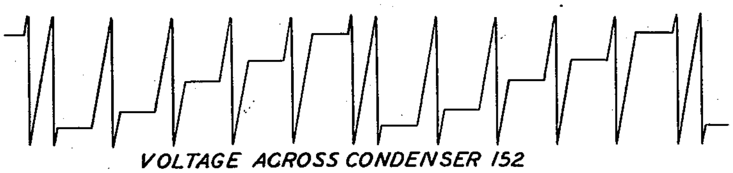

VOLTAGE ACROSS CONDENSER 152

INVENTOR
H. L. BARNEY
BY Hugh S. Wertz
ATTORNEY

Oct. 23, 1951 H. L. BARNEY 2,572,586

SWEEP CIRCUIT

Filed March 18, 1950 5 Sheets-Sheet 4

INVENTOR
H. L. BARNEY
BY Hugh S. Wertz
ATTORNEY

INVENTOR
H. L. BARNEY
BY Hugh S. Wertz
ATTORNEY

Patented Oct. 23, 1951

2,572,586

UNITED STATES PATENT OFFICE 2,572,586

SWEEP CIRCUIT

Harold L. Barney, Madison, N. J., assignor to Bell Telephone Laboratories, Incorporated, New York, N. Y., a corporation of New York Application March 18, 1950, Serial No. 150,505

5 Claims. (Cl. 315—24)

This invention relates primarily to scanning systems and more particularly to sweep circuits which can be utilized in electron beam tubes to deflect and switch the beam alternately from a vertical to an oblique position.

This application is a division of the copending joint application of H. L. Barney, L. C. Peterson, R. K. Potter and R. W. Sears, Serial No. 74,616, filed February 4, 1949, which issued on November 28, 1950 as United States Patent 2,531,600 and which relates to electrical transducers of the type which are known in the art as transversal filters. Therein, there is described a transversal filter in which the input signal is stored as a series of parallel records on a storage surface by means of a recording electron beam and thereafter the desired output is derived therefrom by a wiping electron beam which neutralizes points on each of the stored records in such a manner that the neutralized points lie along a succession of parallel lines. A single beam is utilized both for the recording and the wiping operations, the beam being switched in succession from a vertical recording position to an oblique wiping position preceding and following the recording beam. Associated with this beam is a mica target, on the back of which is positioned a plurality of transverse parallel metal bars, each of which is connected to an output circuit. Adjacent the other face of the target is a barrier grid. During the recording operation in which the beam traces a vertical line on the target, the potential of the barrier grid is signal-varied, producing a charge record on the target; during the wiping operation in which the beam moves across the target in a direction obliquely related to and immediately preceding and following the vertical recording line, the potential of the barrier grid is maintained at a constant value to enable the recorded charge to be neutralized. The complex scanning motion of the beam, which executes a series of vertical recording lines in alternation with oblique scanning lines, is controlled by two pairs of electrostatic deflection plates to which are connected multi-element sweep circuits. In synchronism with the switching of the beam, the potential of the barrier grid is shifted so that during the vertical recording position the potential of the grid is varied in accordance with the input signal, while during the wiping operation the potential of the grid is changed to a constant value to enable the charge recorded on the target to be neutralized. Currents proportional to the recorded charge are thus enabled to flow from the respective target backing strips during the wiping operation.

It is an object of this invention to provide improved switching and scanning systems, and more particularly such systems which, for example, can be utilized in transversal filters of the kind described hereinabove.

In accordance with the invention, these objects are realized in a scanning system which sweeps the electron beam in a series of parallel vertical lines and a series of parallel oblique lines, the beam switching alternately from a vertical to an oblique sweep. In one aspect of the invention, there is also provided switching means cooperating with this sweep system for synchronously altering the potential of the barrier grid in a transversal filter system from a signal-varied to a constant value, respectively.

In an illustrative embodiment in accordance with the invention, a first sweep circuit supplies a series of saw-tooth waves to a first pair of deflecting plates. To a second pair of plates in space quadrature therewith, a second sweep circuit supplies a series of waves each of which includes a first sweeping portion, a steady portion, a second sweeping portion and a return portion occurring at varying intervals between the two sweep portions. These voltages cooperate to sweep the electron beam in two series of substantially parallel lines, each series having obliquely related directions, and the individual lines of each series being laid down in alternate succession. Associated therewith, are gating circuits which synchronously switch the beam from a vertical storing function to an oblique reading function.

The invention will be more clearly understood by reference to the following description taken in conjunction with the accompanying drawings forming a part thereof, in which:

Figs. 5 (A through F) illustrate voltage wave forms at various points in the circuit of Fig. 4;

Figs. 7 (A through D) illustrate voltage wave forms at various points in the circuit of Fig. 6.

Figure 1:
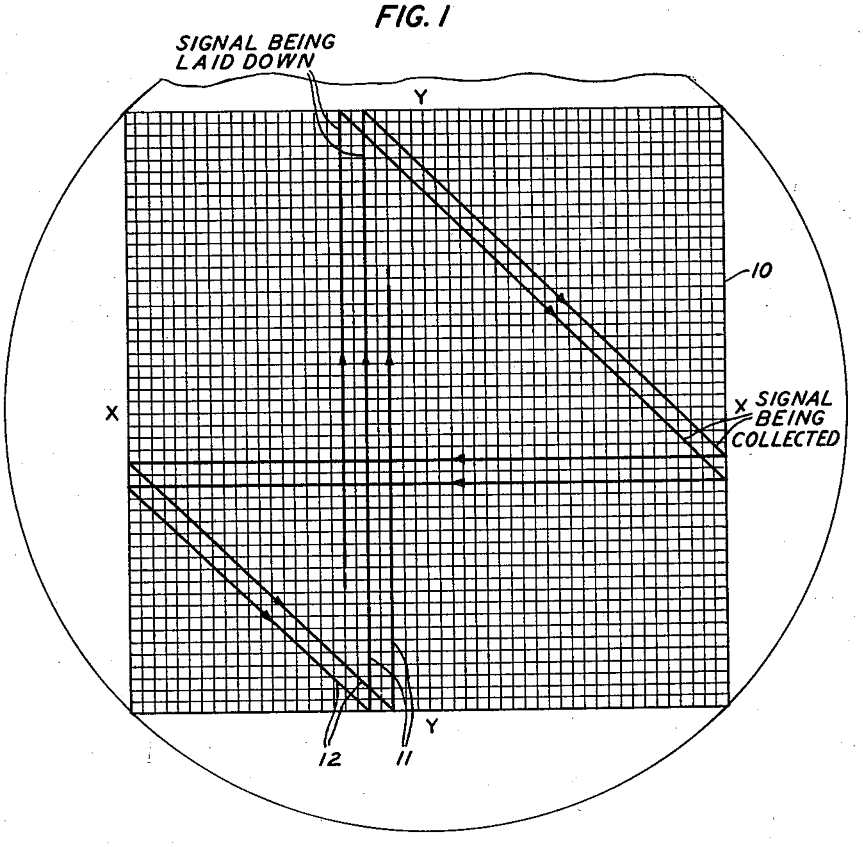
Fig. 1 illustrates the sweep pattern produced, in accordance with the invention, on a target screen.

Referring more specifically to the drawings, Fig. 1 illustrates the trace of the electron beam over the target 10, formed by circuits in accordance with the invention. The path describes two series 11 and 12 of substantially parallel lines. The two series have obliquely related directions to one another, the first 11 being vertical and the second 12 diagonal, and the individual lines of each series are laid down in alternate succession. This configuration results from the cooperation of sweep voltages supplied to the two pairs of deflecting plates, in space quadrature to one another, of the electron beam tube, which are to be designated the X-axis and the Y-axis plates, respectively.

Figure 2:
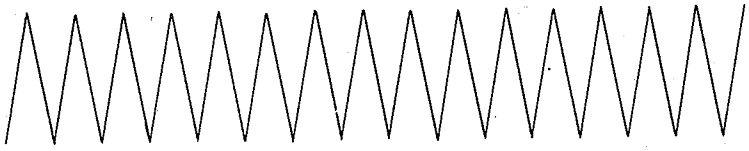
Figs. 2 and 3 illustrate the sweep voltages on the Y-axis and X-axis deflecting plates, respectively, which cooperate to produce the sweep pattern of Fig. 1.

Fig. 2 illustrates the sweep voltage wave on the Y-axis plates, which has a simple saw-tooth voltage slope of a kind which is well known in the art.

Figure 3:
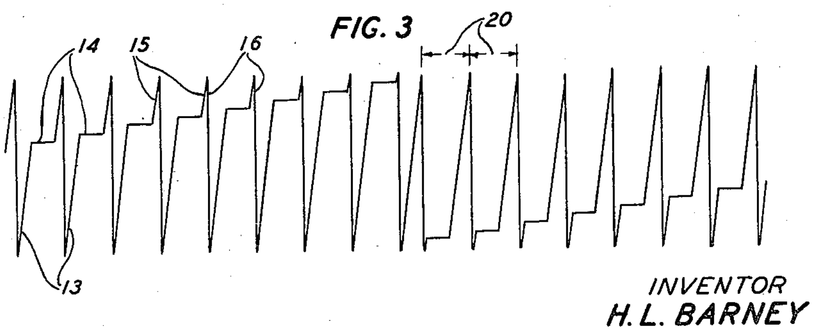

Fig. 3 illustrates the sweep voltage which is applied to the X-plates. It consists of a series of voltage waves 20, each of which includes a first sweeping portion 13, a steady or constant portion 14, and a second sweeping portion 15, followed by a sharp return portion 16. The X-axis voltage remains constant during one-half cycle of this wave 20, represented by the steady portion 14, during which time the trace moves up the target 10 along the vertical line 11 shown in Fig. 1. During the remaining one-half cycle thereof, the trace moves down the mosaic at a constant rate. The first sweep portion 13 preceding the steady portion 14 causes the trace to follow a diagonal from the left-hand edge of the target 10 to the lower edge thereof. Then follows the one-half cycle steady portion 14 which raises the beam vertically to the top edge; thereafter the second sweep portion 15 causes it to follow a diagonal substantially parallel to that produced by the first sweep portion 13 to the right-hand edge. The return portion 16 rapidly restores the trace to the left-hand edge, at which time it has been slightly displaced from its starting point. This sequence is repeated until the whole target 10 has been scanned in this fashion.

The cyclic repetition rates of the wave forms shown in Figs. 2 and 3 are determined by certain constants which in the description hereinafter will be designated as follows:

$2f_0$=frame frequency;

$af_0$=scanning frequency, or lines per second; and $a/2$=number of lines per frame.

In one embodiment constructed by the applicant and referred to hereinafter, $a$ was given a value of 98, and $f_0$ a value of 102.04 cycles per second, so that the scanning frequency was 10,000 lines per second.

Figure 4:
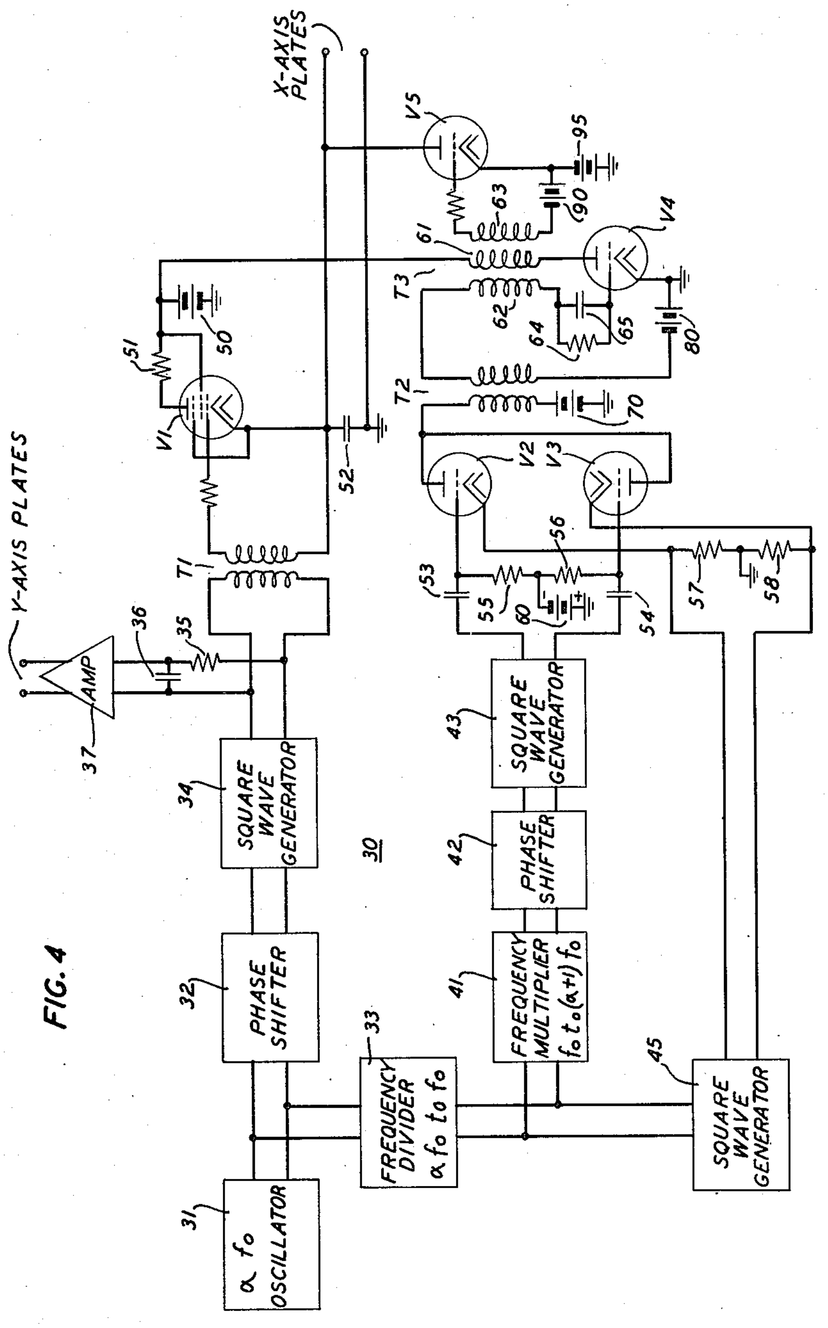
Fig. 4 shows partly diagrammatically and partly schematically an illustrative embodiment of a circuit arrangement for producing sweep voltages of the kind shown in Figs. 2 and 3.

Fig. 4 illustrates, partly in block schematic form and partly diagrammatically, a preferred embodiment of a sweep system 30 which will provide, in accordance with the invention, the voltage wave forms shown in Figs. 2 and 3 to the Y-axis and the X-axis deflecting plates. The output of the sine wave oscillator 31 of frequency $af_0$ is applied both to the phase shifter 32 and to a frequency divider 33 which divides out a voltage of frequency $f_0$. The output of the phase shifter 32 is impressed on a square wave generator 34 designed to produce a symmetrical square wave of the frequency $af_0$ from the sine wave input. One portion of the output energy of this square wave output is passed through an integrating network comprising the resistance 35 and the capacitance 36. The output of this integrating network is amplified by the amplifier 37 and thereafter supplied to the Y-axis deflection plates. By proper selection of the values for the resistance 35 and capacitance 36, a triangular saw-tooth wave of the kind shown in Fig. 2 can be produced in a manner well known in the art. A second portion of the output energy of the square wave generator 34 is supplied to the primary winding of the transformer T1. The output of the frequency divider 33 is applied to a frequency multiplier 41 which produces an output of frequency $(a+1) f_0$. This is converted by means of the phase shifter 42 and the square wave generator 43 to a square wave of frequency $(a+1) f_0$. The frequency multiplier 41 can comprise, for example and in accordance with the embodiment constructed by the applicant, two tandem-tuned stages in which the first stage selects the ninth harmonic and this harmonic is made to overload a vacuum tube stage and the eleventh harmonic of the resultant signal is selected by another tuned circuit in the output of this latter overloaded stage. This gives a combined frequency multiplication of $11\times9$ or 99 times, resulting in a frequency of 10,102.04 cycles per second. The output of the divider 33 is also supplied to the square wave generator 45 which produces a square wave output of frequency $f_0$. The square wave of the frequency $af_0$, derived from the square wave generator 34 is supplied by means of the transformer $T_1$ to the control grid of the vacum tube V1. Tube V1 is operated so that it is rendered nonconducting on the negative half of the signal input. During the positive half thereof, however, tube V1 conducts and plate current flows from the direct-current potential source 50 through resistance 51 and the tube V1 and builds up a positive charge on condenser 52, connected between the cathode of tube V1 and ground. The output terminals of the square wave generator 43 are connected through the small condensers 53 and 54 to the grids of triodes V2 and V3 respectively. The grids thereof are also connected through the resistances 55 and 56 respectively to the negative terminal of the direct-current potential source 60 which has its positive terminal connected to ground. The time constants of the combinations of condenser 53 with resistance 55 and of condenser 54 with resistance 56 are small so that the signals applied to the grids of tubes V2 and V3 resulting from the square wave input supplied by the generator 43 take the form of a series of short pips as illustrated in Figs. 5A and 5B. The output terminals of the square wave generator 45 are connected to the cathodes of tubes V2 and V3 respectively. Resistances 57 and 58 are also connected from the cathodes of tubes V2 and V3 to ground. Consequently, on one half of the square wave input from the generator 45, the cathodes of tubes V2 and V3 are driven positive and negative, respectively, to ground. However, on the succeeding half-cycle, the polarities thereof are reversed. Fig. 5C illustrates the wave form of the voltages applied to these cathodes. The biases and pips on the grids of the triodes V2 and V3 and the amplitudes of the square wave signals applied to the cathodes thereof are adjusted so that, for each of the triodes V2 and V3, plate current flows therein only while a positive pip is applied to the grid thereof at a time when its cathode is driven to a negative potential with respect to ground by the square wave input of generator 45. The plates of triodes V2 and V3 are connected in parallel to the primary of transformer T2. The plate potentials thereof are supplied from the direct-current source 70. For the condition of operation hereinabove described, the sum of these plate currents will be a series of pips as shown in Fig. 5D. It will be noted that the pips occur regularly at intervals of $$\frac{1}{(\alpha+1)f_0}$$

seconds except when the square wave shown in Fig. 5C reverses polarity. At times of reversal, the interval between the pips is one half that for the remainder of the cycle. The pips as shown in Fig. 5C operate through the transformer T2 to trigger a blocking oscillator which comprises the triode V4. Tube V4 has its grid biased negatively beyond cut-off with respect to the cathode by the direct-current potential source 80. The positive pips supplied from the transformer T2 to the grid of triode V4, however, render it conducting and plate current flows. This plate current flows through the winding 61 of the three-winding transformer T3 which is in the plate circuit of triode V4. The current therethrough induces a voltage in winding 62 of the transformer T3 which is in series with the grid circuit of tube V4. This induced voltage is of a polarity and magnitude to make this grid sufficiently positive with respect to its cathode to cause grid current flow. This current flows through a circuit comprising the resistance 64 and the condenser 65, and the latter is charged thereby in a direction that tends to make the grid more negative. This prevents oscillations, and after one-half cycle the grid has a large negative potential which thereafter leaks off through the resistance 64. This complete cycle of operation of the blocking oscillator results in a short pulse of plate current in the tube V4 for every positive pip of the signal shown as Fig. 5D. This short surge of plate current through the winding 61 of the transformer T3 induces a voltage pulse in winding 63 thereof, which, in turn, is supplied to the grid of triode V5. The latter is normally biased past cut-off by the direct-current potential source 90 but the positive pulse supplied from winding 63 drives the grid sufficiently positive to cause plate current flow therein. The plate voltage potential therefor is derived by connecting the cathode thereof to the negative terminal of the direct-current source 95, which has its positive terminal grounded. The plate of the tube V5 is connected to the ungrounded terminal of the condenser 52, which is discharged by plate current flow in tube V5. Stated differently, tube V5 in its conducting state serves as a low impedance path through which condenser 52 discharges very rapidly to ground.

The X-axis sweep voltage is derived across the condenser 52. The wave form of the input of tube V1 by way of transformer T1 is illustrated in Fig. 5E. If tube V1 is operated so that it is non-conducting during the half-cycle when the input thereto is negative and conducting during the positive half-cycle so as to charge condenser 52, and if condenser 52 is discharged quickly at each pip of the wave form shown in Fig. 5D, the resultant wave form across the condenser 52 will be as illustrated in Fig. 5F. The horizontal stair steps thereof, when the sweep voltage is steady, correspond to the intervals when tube V1 is non-conducting. The sweeping portions thereof, when the sweep voltage is increasing substantially linearly, correspond to the intervals of charging of condenser 52 by the flow of plate current in tube V1, and the vertical restore portions correspond to the rapid discharging of condenser 52 through the plate circuit of tube V5.

The illustrations of Figs. 5A to 5F inclusive, show wave shapes for a value of $\alpha$ equal to 10, which is comparatively low. In this case, there are but five stair steps $$\left(\frac{\alpha}{2}\right)$$

in the fundamental period of the wave shape of Fig. 7F. Ordinarily, $\alpha$ preferably would be larger than 10.

Figure 6:
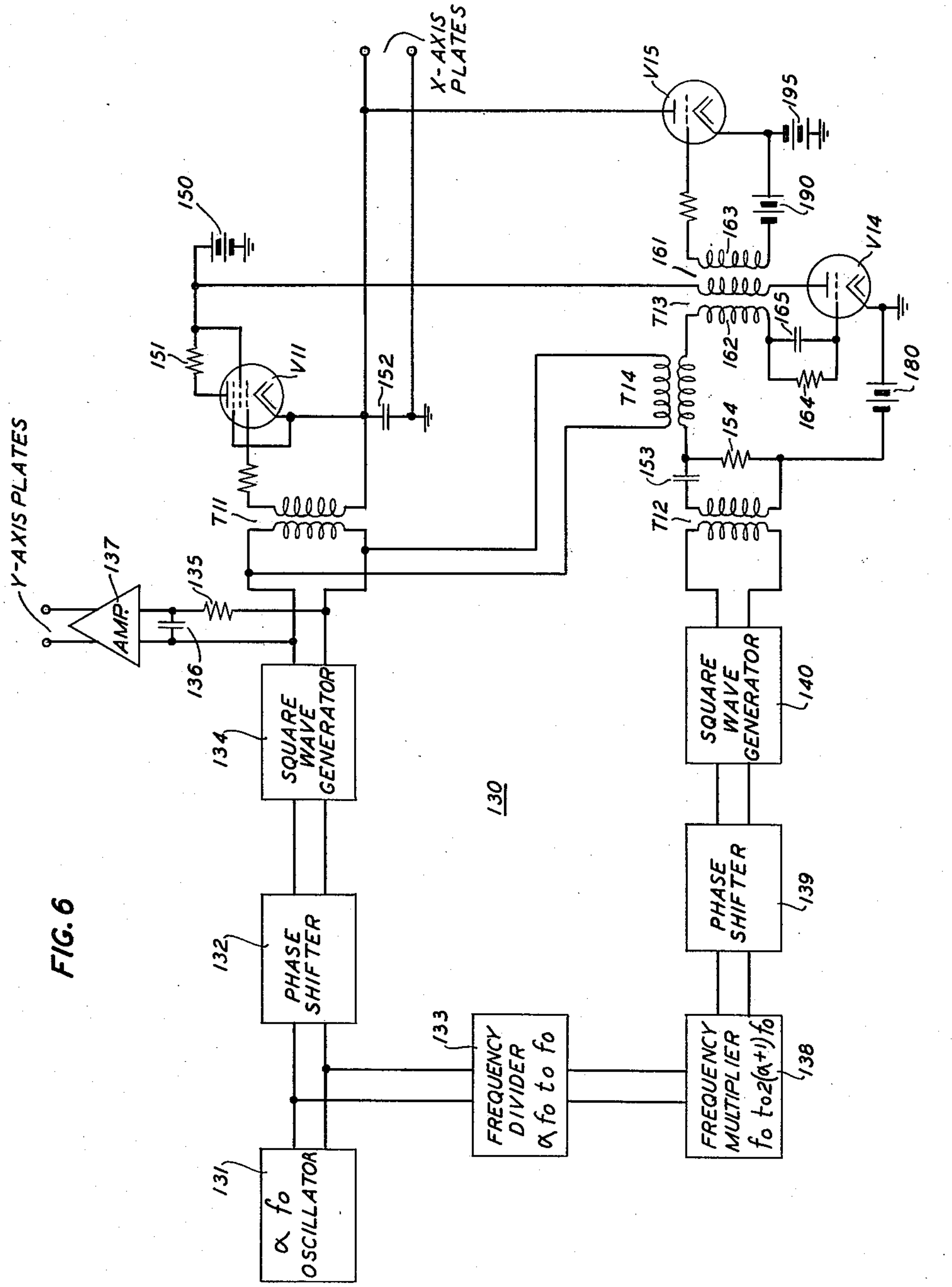
Fig. 6 shows, partly diagrammatically and partly schematically an alternative arrangement for producing sweep voltages of the kind shown in Figs. 2 and 3.

The preceding description has outlined one illustrative embodiment, shown as the arrangement 30 of Fig. 4, in accordance with the invention. Fig. 6 illustrates an arrangement 130 which is a modification thereof. Referring thereto, the output of an oscillator 131 of frequency $\alpha f_0$ is supplied through the phase shifter 132 and the square wave generator 134 to an integrating circuit comprising a resistance 135 and a condenser 136 which, as described hereinbefore, can be adjusted to produce a triangular saw-tooth wave which, after amplification by an amplifier 137, spplies the Y-axis deflection plates. This wave is of the kind illustrated in Fig. 2. The output of the oscillator 131 also supplies a frequency divider 133 for providing a wave of frequency $f_0$ which is converted by the multiplier 138 to a frequency of $2(\alpha+1)f_0$. The output thereof is supplied through the phase shifter 139 to a square wave generator 140, which produces a square wave output of frequency $2(\alpha+1)f_0$. The output terminals of the square wave generators 134 and 140 are connected to the primary windings of the transformers T11 and T12, respectively. In a manner analogous to that described before with reference to Fig. 4 where here, in arrangement 130, transformer T11, tube V11, source 150, resistance 151, and condenser 152 perform identical functions to those of transformer T1, tube V1, source 50, resistance 51, and condenser 52 of the arrangement 30 shown in Fig. 4, tube V11 is rendered non-conducting during the negative half-cycle of the square wave input thereto and conducts during the positive half-cycle when the plate current flow therein charges the condenser 152. Fig. 7B illustrates the square wave input to tube V11. The discharging of condenser 152 is by way of tube V15 under control of blocking oscillator tube V14 in the same manner that condenser 52 is discharged by way of tube V5 under control of the blocking oscillator tube V4. The associated circuit elements of arrangement 130, namely, transformer T13, voltage sources 180, 190, and 195, resistance 164, and condenser 165, perform functions identical to those explained in connection with transformer T3, sources 80, 90, and 95, resistance 64, and condenser 65, of the arrangement 30. The input signal supplied to the grid of the blocking oscillator V14 differs from that of the corresponding oscillator V4 of arrangement 30 and is illustrated in Fig. 7C. This represents the sum of two voltages. The first is supplied through the secondary winding of the transformer T14 whose primary winding is connected across the square wave generator 134, and the second is derived across the resistance 154. Condenser 153 and resistance 154 are across the secondary winding of transformer T12, whose primary winding is connected across the output terminals of the square wave generator 140. Since both condenser 153 and resistance 154 are small, for a square wave input to the transformer T12, short pips will be produced across resistance 154 because of the differentiating action of condenser 153 and resistance 154. The wave form of the voltage across resistance 154 is illustrated in Fig. 7A. This voltage, when combined with a voltage having the form shown in Fig. 7B which is the square wave output of generator 134, gives the resultant voltage illustrated in Fig. 7C, which is applied to the grid of tube V14. The negative bias thereon supplied by the direct-current potential source 180 prevents plate current flow in tube V14 except during short intervals when the positive pips which are shown in Fig. 7C, are applied thereto. When this flow of plate current is initiated in the tube V14, the consequent short voltage pulse is applied to the grid of the tube V15 to render it conducting and permit the discharge therethrough of the condenser 152, as described in connection with the arrangement 30 shown in Fig. 4. The timing of these discharge pulses is the same as that for arrangement 30, and in combination with the charging function of condenser 152, which is controlled by the square wave input to the tube V11, there results a voltage across the condenser 152 of wave shape such as is shown in Fig. 7D. This is the desired wave shape for the X-axis sweep voltage and is similar to that shown in Fig. 3.

The sweep voltages on the Y-axis plates and X-axis plates, which are illustrated in Figs. 2 and 3, respectively, cooperate in the electron beam tube to produce a sweep pattern of the electron beam on the target of the kind shown in Fig. 1.

The manner in which the motion of the beam on the target mosaic 10 is synchronized with the signal recording and wiping operations will be understood from the following description.

Figure 8:
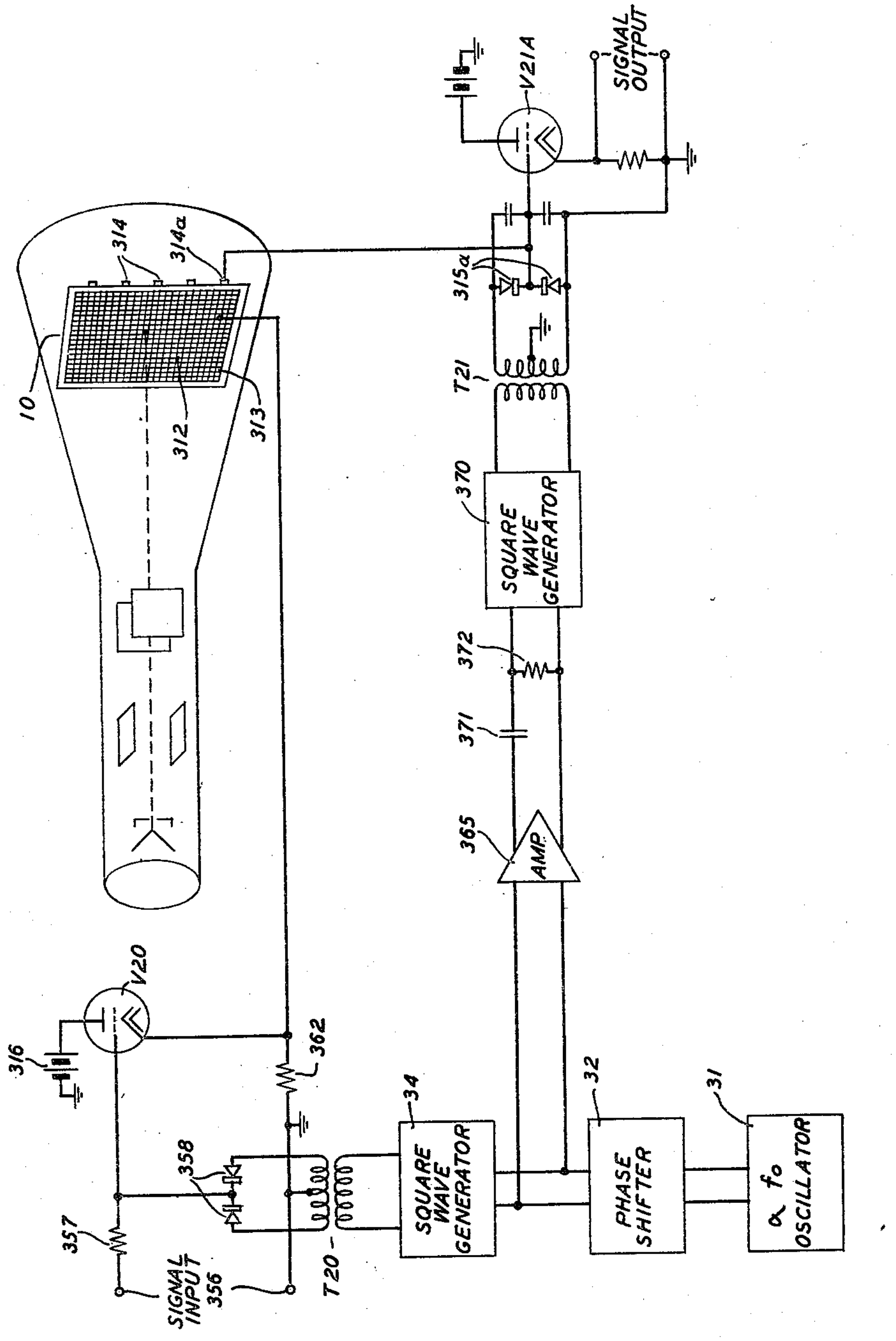
Fig. 8 shows, partly in block schematic form and partly diagrammatically, a switching arrangement in accordance with the invention.

Referring to Fig. 8, the signal input which is desired to be stored is appiled through leads 356 to a gating circuit, comprising series resistance 357 and crystal diodes 358, on which is impressed a square wave signal having a frequency $af_0$, which is applied through transformer T20 from the square wave generator 34 already mentioned with reference to Fig. 4. Diodes 358 are, for example, rectifying devices, such as the well-known germanium or silicon crystal rectifiers widely used in microwave detectors. During the first half of the square wave voltage cycle, when the voltage applied through transformer T20 to diodes 358 is in the direction of easy current flow, the alternating-current impedance of the diodes 358 is low so that the signal tending to appear on the grid of vacuum tube V20 is shunted to ground through the aforesaid low impedance of the crystal diodes 358 and the secondary of transformer T20. On the other half cycle of the square wave applied voltage, the crystal diodes 358 have a high impedance, and the incoming signal is not appreciably shunted to ground. The frequency of the square wave voltage should be at least twice as great as the highest input signal frequency, so that the signal which is applied to the grid of vacuum tube V20 consists of alternate sections of the input signal wave form, interspersed with sections of zero signal voltage. Vacuum tube V20 is supplied with plate potential from potential source 316, and a resistor 362 is connected between its cathode and ground, making it a cathode follower stage. A replica of the signal applied to the grid of tube V20 is obtained across resistance 362, and impressed on the storage tube barrier grid 312.

As described in the preceding paragraph, the operation of the input gate using crystal diodes 358, is synchronized with the sweep of the beam by the $af_0$ square wave impulse, so that the input signal to leads 356 is shunted to ground during the intervals when the beam is proceeding along a diagonal path over the target mosaic 10, and the input signal is not shunted but appears on the input mosaic grid 312 during that part of the cycle when the beam is moved along a vertical path. During the interval when the beam is moved along the vertical path, the target 10 adjacent to the mosaic grid 312 on which the beam impinges is charged at each point to a potential corresponding to the instantaneous value of the input signal voltage on the mosaic grid 312 at that time, in a manner well known in the storage tube art.

During the succeeding wiping period in which the beam moves over the target diagonally, the mosaic grid 312 is held at constant or reference potential, and the mica surface of target 10 traversed by the beam spot is discharged point by point to this reference potential, whereby the recorded charge is neutralized, leaving the mica element 313 at a constant potential for a repetition of the recording operation. During this discharging of the front surface of the mica, capacitive currents are caused to flow in the output bars 314 on the back surface of the mica plate. Thus, if the potential of a small area on the front surface of the mica is caused to change by a few volts, a bar directly behind this small area will have its potential correspondingly changed in an amount depending on the capacity between the small area on the front and the bar on the rear of the mica.

Each bar is connected to a grid of an associated tube. In Fig. 8, there is shown only bar 314*a* which is connected to the grid of tube V21A. In addition, each bar is also connected to a clamping circuit which is arranged to shunt the bar to ground through a low impedance during the period when the signal is being laid down on the mica, i. e., when the electron beam is moving along a vertical path. The clamping circuit for bar 314*a* comprises two crystal diodes 315*a* in series, with their mid-point connected to the bar, and their outer ends connected to a source of square wave signals, namely, the secondary of transformer T21. The center tap of the secondary of transformer T21 is connected to ground. The operation of this clamping circuit is thus similar to that of the input gate circuit including crystal diodes 358 and transformer T20, described previously. Other crystal diodes are arranged in a similar manner to clamp any additional bars. All of these crystal diodes receive their driving voltage through the one transformer T21, so that all bars are simultaneously either shunted to ground, or are effectively unshunted to supply an output circuit depending on the polarity of the square wave drive voltage.

The source of square wave voltage for the bar clamp circuits comprising transformer T21 and the crystal diodes 315*a* is square wave generator 370 which is similar to the square wave generator 34. The input of generator 370 is a sine wave of $af_0$ frequency derived from the output of phase shifter 32 by way of amplifier 365. The output of amplifier 365 passes through the network comprising condenser 371 and resistance 372 to the input of a square wave generator 370. The function of the circuit comprising condenser 371 and resistance 372 is to shift the phase of the $\alpha f_0$ sine wave a small amount so as to make the bar clamp circuits operate from the shunting to the open condition a very short interval after the barrier grid is switched from the signal value to the constant value of voltage, thereby avoiding a large transient surge of potential at the bars due to the sudden shift of potential on the mosaic grid 312 which has an appreciable capacity to the bars.

It is to be understood that the above-described arrangements are illustrative of the principles of the invention. Other arrangement can be devised by one skilled in the art without departing from the spirit and scope of the invention.

What is claimed is:

1. In combination, an electron beam source, a target interposed in the path of said beam, a first and second pair of plates in space quadrature for deflecting said beam, a source of a first voltage which comprises a series of saw-tooth waves, means for applying said first voltage to said first pair of deflecting plates, a source of a second voltage which comprises a series of waves which include a first sweep portion, a steady portion, a second sweep portion, and a return portion, the steady portion occurring at varying intervals between the two sweep portions, and means for applying this second voltage to said second pair of deflecting plates, the first and second voltages cooperating to sweep the electron beam across the target in two series of substantially parallel lines, said series having obliquely related directions in the plane of said target and the individual lines of said series being laid down in alternate succession.

2. An arrangement according to claim 1 in which said second source comprises means for generating a first series of alternating pulses of frequency $\alpha f$ a condenser, a means for alternately varying and keeping steady the potential on said condenser in synchronism with said first series, means for generating a second series of alternating pulses of frequency $(\alpha+1)\ f_0$, means for generating a third series of pulses of frequency $f_0$, means for combining said second and third series to produce a fourth series of pulses, means rendered active by said fourth series for rapidly discharging said condenser, and means for utilizing the potential on said condenser.

3. An arrangement according to claim 1 in which said second source comprises means for generating alternate pulses of frequency $\alpha f_0$, a condenser, means for alternately varying and keeping steady the potential on said condenser in synchronism with said first series, means for generating a second series of alternating pulses of frequency $2(\alpha+1)\ f_0$, means for deriving therefrom a third series of pulses, means actuated by said third series of pulses for discharging said condenser, and means for utilizing the voltage across said condenser.

4. In an electron beam storing device, an arrangement according to claim 1 and means for alternately switching in synchronism said beam to a storing function during the first of said two series of substantially parallel lines and to a reading function during the second of said series.

5. In an electron beam storage system, an input signal source, an output circuit, an electron beam source, a target interposed in the path of said beam, an input element adjacent the surface of said target in the direction of said beam, an output element adjacent the opposite surface of said target, two pairs of deflecting plates in space quadrature, a source of a first voltage for the first pair of said plates, which voltage comprises a series of saw-tooth waves, a source of a second voltage for the second pair of said plates, which voltage comprises a series of waves which are made up of steady and varying portions, a gating circuit associated with said input element to permit said input element to be varied in accordance with energy from the input source only during the steady portions of said second voltage, and a gating circuit associated with said output element to permit said output element to supply an output signal to the output circuit only during the varying portions of said second voltage.

HAROLD L. BARNEY.

REFERENCES CITED

The following references are of record in the file of this patent:

UNITED STATES PATENTS

| Number | Name | Date |
|---|---|---|
| 2,439,321 | Starr | Apr. 6, 1948 |